United States Patent
Chu et al.

(10) Patent No.: US 7,388,510 B2
(45) Date of Patent: Jun. 17, 2008

(54) DISPLAY

(75) Inventors: Yao-Wen Chu, Taoyuan (TW); I-Wen Su, Puzih (TW)

(73) Assignees: Qisda Corporation, Taoyuan (TW); Benq Corporation, Taipei (TW)

( * ) Notice: Subject to any disclaimer, the term of this patent is extended or adjusted under 35 U.S.C. 154(b) by 489 days.

(21) Appl. No.: 11/052,119

(22) Filed: Feb. 7, 2005

(65) Prior Publication Data

US 2005/0179704 A1 Aug. 18, 2005

(30) Foreign Application Priority Data

Feb. 12, 2004 (TW) .............................. 93103393 A

(51) Int. Cl.
*G08B 5/00* (2006.01)
(52) U.S. Cl. .............................. 340/815.83; 340/691.6; 345/649; 361/681; 361/682
(58) Field of Classification Search ............. 340/691.6, 340/815.83; 345/649; 361/681, 682
See application file for complete search history.

(56) References Cited

U.S. PATENT DOCUMENTS

| | | | | |
|---|---|---|---|---|
| 5,329,289 A | * | 7/1994 | Sakamoto et al. | 345/659 |
| 6,522,529 B1 | * | 2/2003 | Huilgol et al. | 361/681 |
| 6,963,487 B2 | * | 11/2005 | Billington et al. | 361/686 |
| 7,042,711 B2 | * | 5/2006 | Tanaka et al. | 361/679 |
| 7,170,534 B2 | * | 1/2007 | Son et al. | 345/659 |
| 2003/0222848 A1 | * | 12/2003 | Solomon et al. | 345/156 |
| 2004/0201595 A1 | * | 10/2004 | Manchester | 345/649 |

* cited by examiner

*Primary Examiner*—Jeffery Hofsass
*Assistant Examiner*—Edny Labbees
(74) *Attorney, Agent, or Firm*—Thomas, Kayden, Horstemeyer & Risley

(57) ABSTRACT

A display comprises a base, a display module and a sensing device. The base has a sensing region and the display module has a control device. The sensing device is electrically connected with the control device and the display module is rotatably coupled to the base. The control device can determine that an angle of rotation of the display module with respect to the base according to a corresponding relation between the sensing device and the sensing region of the base.

17 Claims, 10 Drawing Sheets

DISPLAY

This application claims the benefit of Taiwan application Serial No. 93103393, filed Feb. 12, 2004, the subject matter of which is incorporated herein by reference.

BACKGROUND OF THE INVENTION

1. Field of the Invention

The invention relates in general to a display, and more particularly to a display whose display module can rotate with respect to the base.

2. Description of the Related Art

In response to the renovation of computer products, the convenience and practicality of use, several displays are equipped with a rotatable display module.

The display has a display module and a base for supporting the display module. Generally speaking, when the display module of a display with a rotatable display module rotates 90 degrees with respect to the base to be vertically disposed on the base from an ordinary state, a state of being horizontally disposed on the base for instance, on screen display (OSD) which can be displayed on the display module also rotates 90 degrees along with the display module, providing the user with a more convenient operation of the display.

A conventional display uses a touch-press type switch to control the OSD to rotate along with the rotation of the display module. The touch-press type switch is disposed on a rotation axis of the display module which rotates with respect to the base. Besides, a conducting wire is used to connect the touch-press type switch with the control circuit board inside the display module.

When the display module rotates 90 degrees, due to the change of position, the display module will touch the touch-press type switch disposed on the rotation axis. Meanwhile, the touch-press type switch will output a signal to the control circuit board. After that, the control circuit board will control the OSD to rotate 90 degrees along with the display screen according to the signal.

It can be seen from the above disclosure that the conventional display uses a mechanic sensing device to sense the rotating state of the display module, so the following factors need to be taken into considerations. Firstly, the position of the touch-press type switch on the rotation axis must be touched by the display module after rotation. Secondly, whether the display module, during the course of rotation, will twist the conducting wire, which is used for electrically connecting touch-press type switch and control circuit board, and whether interference exists between the conducting wire and other elements should be taken into consideration when it comes to wiring structural design.

Therefore, conventional display is disadvantaged because its structure is complicated, manufacturing process is difficult and cost is high.

SUMMARY OF THE INVENTION

It is therefore an object of the invention to provide a display whose structure is simpler, manufacturing process is easier, and cost is lower.

To achieve the above-identified object, the invention provides a display, which includes a base, a display module and a sensing element. The base has a sensing region the display module has a control element, wherein the display module is rotatably coupled to the base. The sensing element and control element are electrically connected. The control element can determine that display module rotates an angle of rotation with respect to the base according to a corresponding relation between the sensing element and the sensing region. The control element can be a control circuit board, and the angle of rotation is physically equal to 90 degrees.

In the above display of the invention, the sensing element can be an electromagnetic sensing element for generating a magnetic field and for sensing an intensity of the magnetic field. The sensing region causes the intensity of the magnetic field to change. When the abovementioned corresponding relation relates to the relation between the electromagnetic sensing element and the sensing region, the electromagnetic sensing element senses the intensity of the magnetic field, so that the control element can determine that the display module rotates the angle of rotation with respect to a metal base for instance the sensing region includes a penetrating region and a non-penetrating region, wherein the penetrating region penetrates the base, and when the display module rotates an angle of rotation with respect to the base, the electromagnetic sensing element will change to the state of corresponding to the non-penetrating region from the state of corresponding to the penetrating region, so that the intensity of the magnetic field will change. On the other hand, the sensing region can also include a shielding region and a non-shielding region, wherein the shielding region protrudes from the base, and when the display module rotates an angle of rotation with respect to the base, the electromagnetic sensing element will change to the state of corresponding to the non-shielding region from the state of corresponding to the shielding region, so that the intensity of the magnetic field will change.

An on screen display (OSD) can be displayed on the display module of the above-disclosed display according to the invention, and when control element determines that display module rotates an angle of rotation with respect to the base, according to the intensity of the magnetic field, the control element controls the OSD to rotate.

Moreover, in the above-disclosed display according to the invention, the sensing element can be an infra-red sensing element which can emit a first infra-red light for sensing a reflected second infra-red light. When a corresponding relation exist between the infra-red sensing element and the sensing region, the infra-red sensing element senses the second infra-red light, so that the control element can determine that the display module rotates an angle of rotation with respect to the base the sensing region includes a reflecting region and a non-reflecting region, wherein when the display module rotates an angle of rotation with respect to the base, the infra-red sensing element will change to the state of corresponding to the non-reflecting region from the state of corresponding to the reflecting region, so that the infra-red sensing element cannot sense the second infra-red light. On the other hand, the sensing region can also include a non-reflecting region and a reflecting region, wherein when the display module rotates an angle of rotation with respect to the base, the infra-red sensing element will change to the state of corresponding to the reflecting region from the state of corresponding to the non-reflecting region, so that infra-red sensing element can sense the second infra-red light.

Other objects, features, and advantages of the invention will become apparent from the following detailed description of the preferred but non-limiting embodiments the following description is made with reference to the accompanying drawings.

DETAILED DESCRIPTION OF THE INVENTION

Although the invention is exemplified by a preferred embodiment, the scope of the invention is not limited thereto. The preferred embodiment only illustrates a display under the spirit of the invention. The technological features of the invention are elaborated in details below.

Figure 1A:
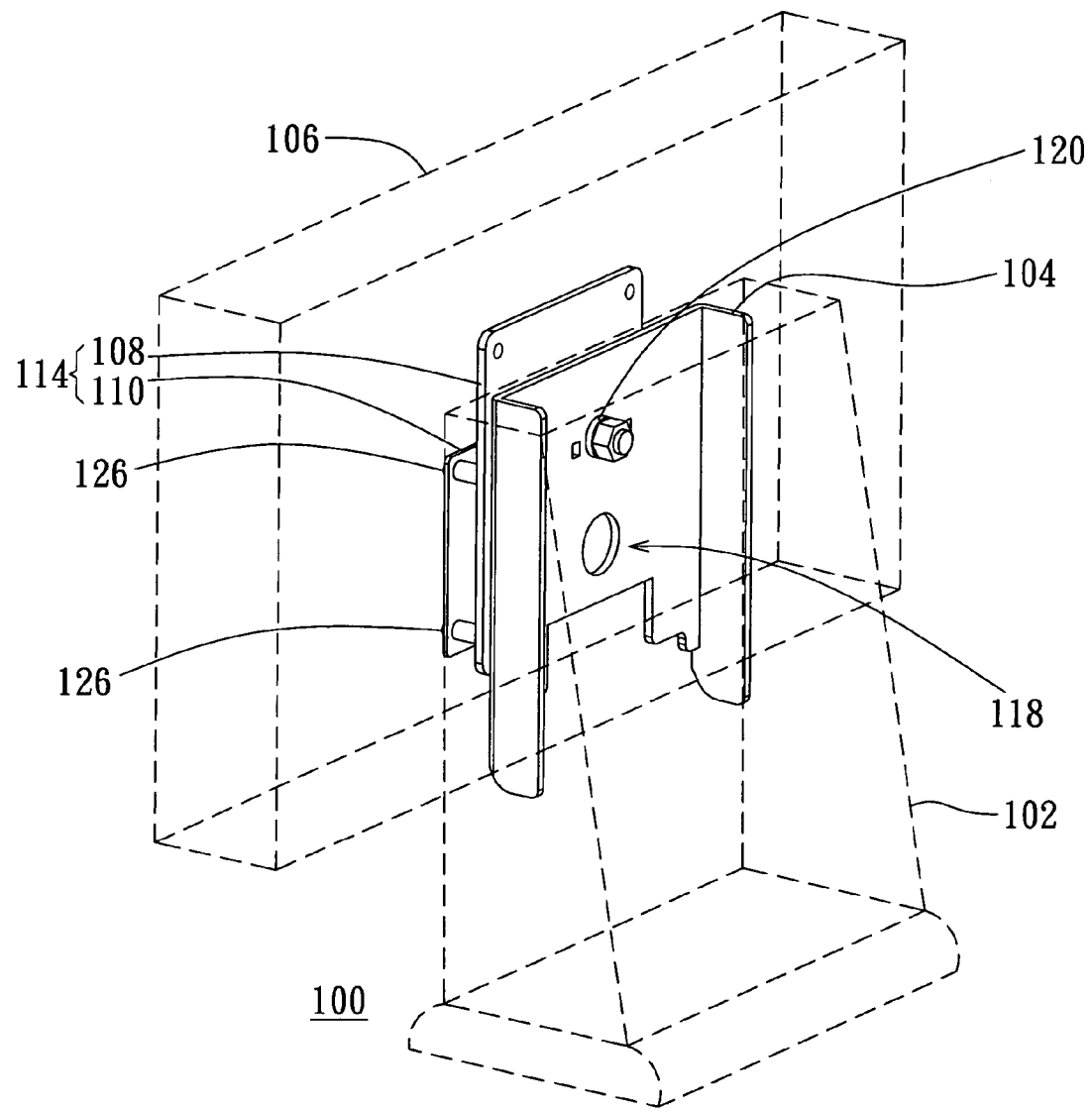
FIG. 1A is a schematic diagram of a display according to preferred embodiment one of the invention.

Referring to FIG. 1A, a schematic diagram of a display according to preferred embodiment one of the invention is shown. In the invention, display 100 includes a base, a disposition board 108, a control element and an electromagnetic sensing element. The base is enveloped by a base casing 102, wherein the base is a metal base 104. The disposition board 108 is also enveloped by a display module casing 106. The control element can be a control circuit board 110. The disposition board 108, the control circuit board 110 and a display panel (not shown in the diagram) are main elements of a display module 114.

Figure 1B:
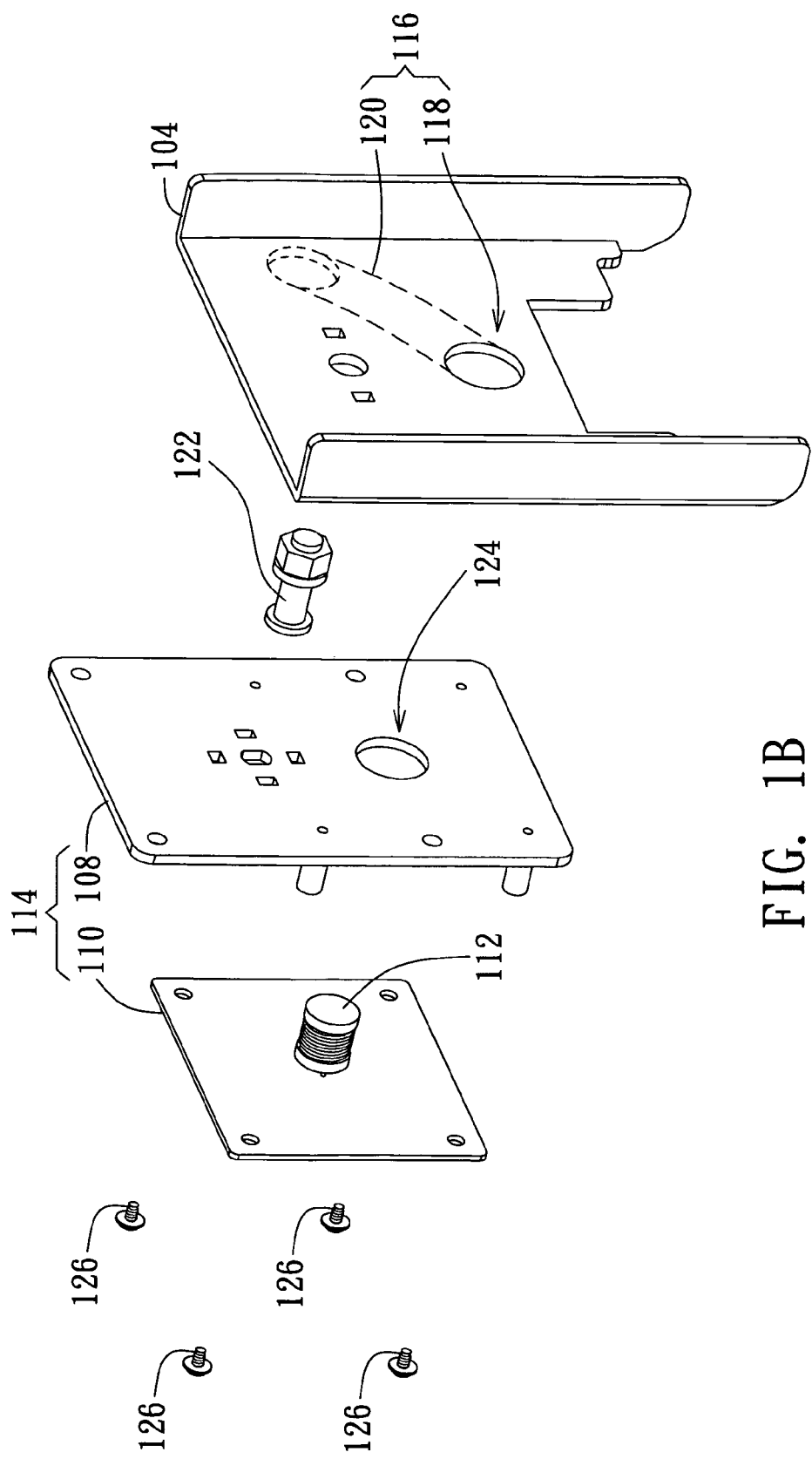
FIG. 1B is a decomposition diagram of the main elements of the display illustrated in FIG. 1A.

Referring to FIG. 1B, a decomposition diagram of the main elements of the display illustrated in FIG. 1A is shown. FIG. 1B is a diagram with base casing 102 and display module casing 106 being removed from FIG. 1A. The metal base 104 has a sensing region 116. The sensing region 116 includes a penetrating region 118 and a non-penetrating region 120, wherein the penetrating region 118 penetrates the metal base 104.

As shown in the diagram, the electromagnetic sensing element 112 is disposed on the control circuit board 110, and the electromagnetic sensing element 112 and control circuit board 110 are electrically connected. The screw 126 is for fastening the control circuit board 110 and the disposition board 108. A via hole 124 is disposed on the disposition board 108, wherein the electromagnetic sensing element 112 disposed on the control circuit board 110 corresponds to the metal base 104 through the via hole 124.

The display module 114 is rotatably coupled to the metal base 104 via a rotation axis 122. According to a corresponding relation between the electromagnetic sensing element 112 and the sensing region 116, the control circuit board 110 can determine whether display module 114 rotates with regard to the metal base 104. The electromagnetic sensing element 112 generates a magnetic field, and further senses the intensity of the magnetic field. The sensing region 116 is for causing the intensity of the magnetic field to change.

When the abovementioned corresponding relation means that the electromagnetic sensing element 112 and the sensing region 116 correspond to each other, the electromagnetic sensing element 112 will sense the intensity of the magnetic field, so that the control circuit board 110 can determine whether the display module 114 rotates an angle of rotation with regard to the metal base 104. The angle of rotation is physically equal to 90 degrees. The corresponding relation is elaborated below.

Refer to FIG. 1A and FIG. 1B together. Under ordinary circumstances as shown in FIG. 1A, the module casing 106 is disposed on the base casing 102, and the electromagnetic sensing element 112 corresponds to the penetrating region 118 disposed on the metal base 104. Meanwhile, since the penetrating region 118 disposed on the metal base 104 is lack of shielding, the electromagnetic sensing element 112 can sense a first intensity of the magnetic field, which is an intensity of a non-shielding magnetic field.

Figure 2A:
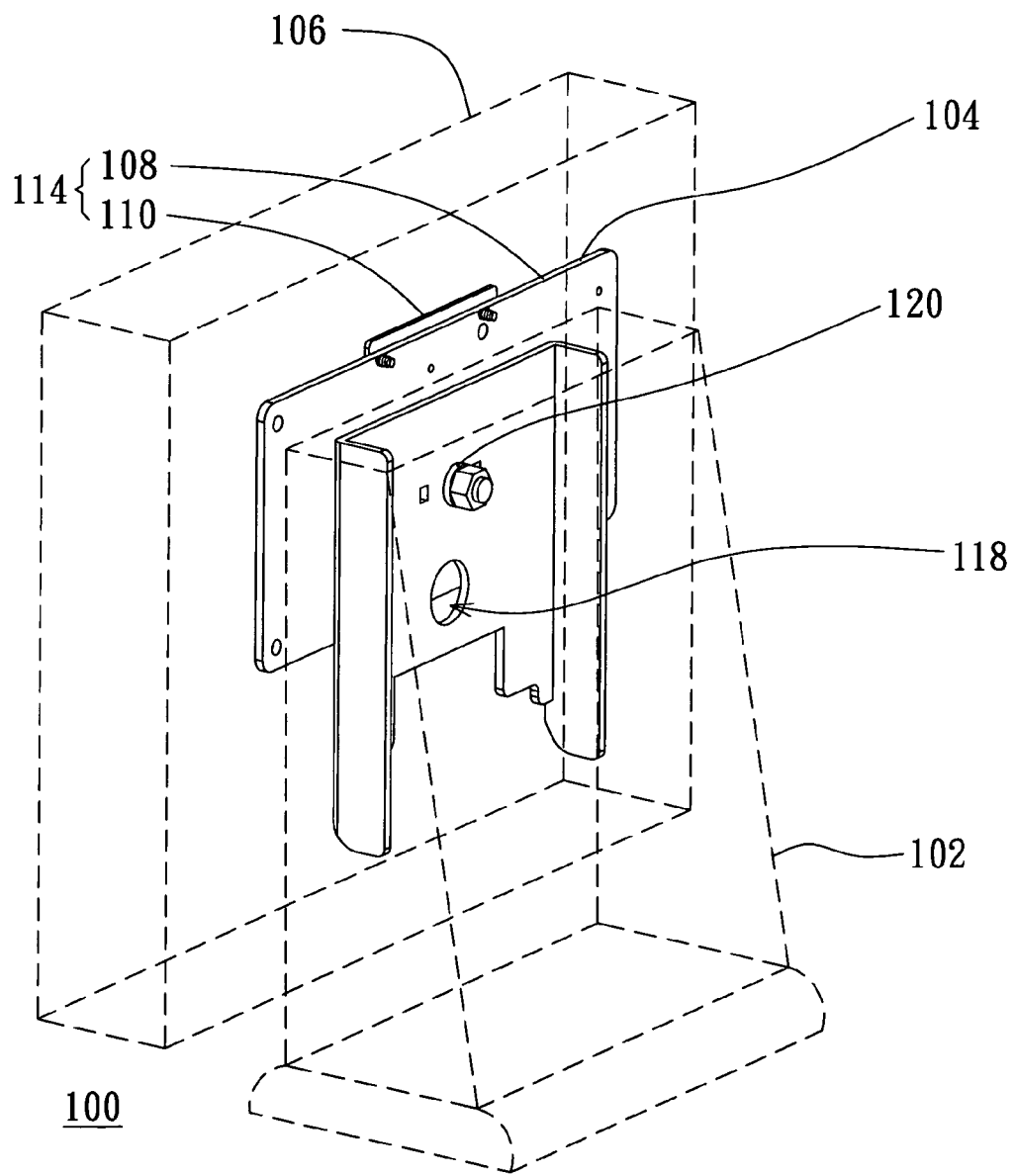
FIG. 2A a schematic diagram showing the state after the display module casing 106 in FIG. 1A has rotated 90 degrees with respect to the base casing 102.
Figure 2B:
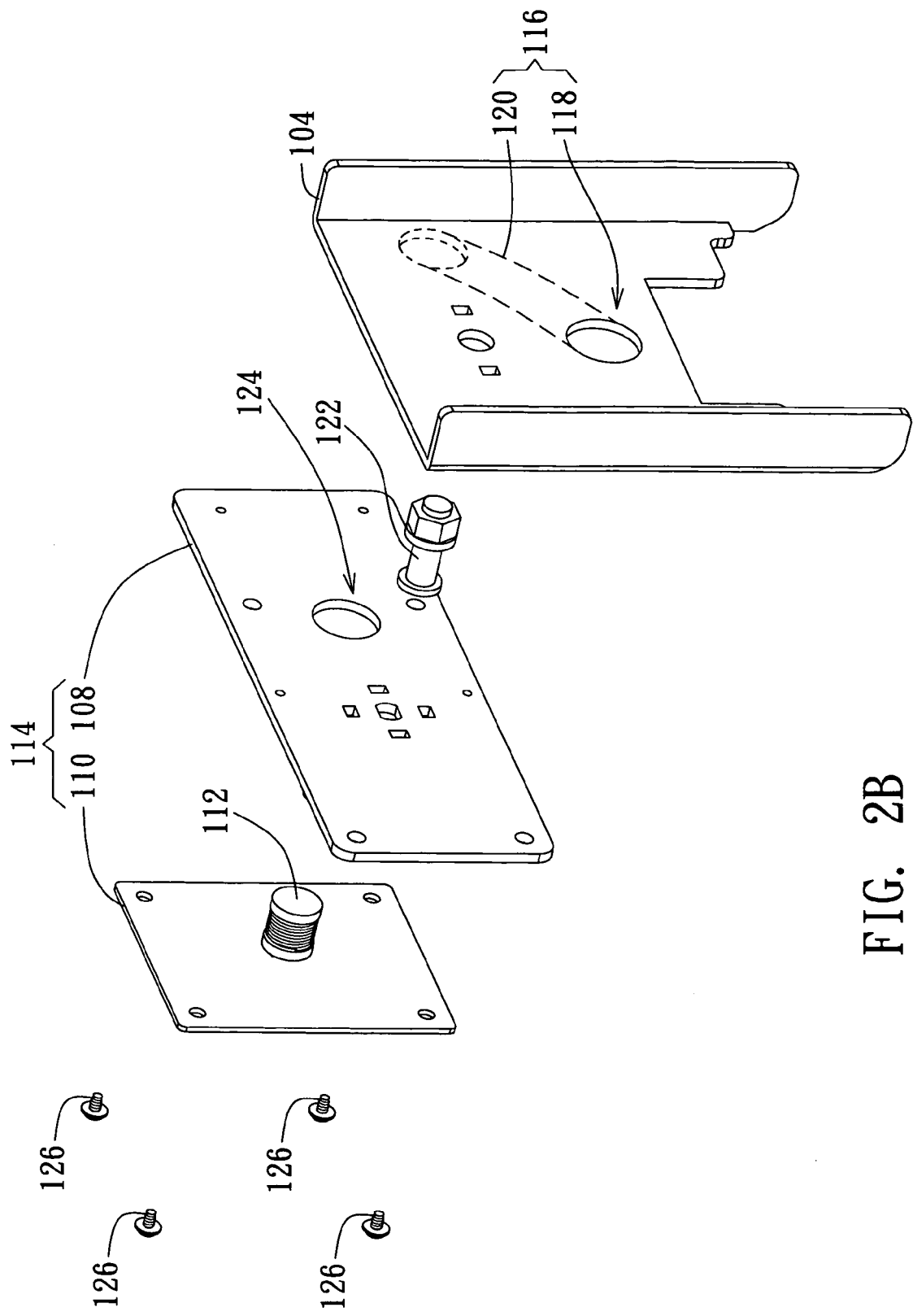
FIG. 2B is a decomposition diagram of the main elements of the display illustrated in FIG. 2A.

Refer to FIG. 2A and FIG. 2B together. FIG. 2A a schematic diagram showing the state after the display module casing 106 in FIG. 1A has rotated 90 degrees with respect to the base casing 102, while FIG. 2B is a decomposition diagram of the main elements of the display illustrated in FIG. 2A.

After the display module 114 has rotated 90 degrees, the electromagnetic sensing element 112 also rotates 90 degrees along the control circuit board 110 to correspond to the non-penetrating region 120 of the metal base 104. The non-penetrating region 120 can shield the magnetic field, so the intensity of the magnetic field sensed by the electromagnetic sensing element 112 will change and differ with the intensity of the magnetic field sensed when corresponding to the penetrating region 118.

When the display module 114 rotates 90 degrees with regard to the metal base 104, the electromagnetic sensing element 112 will change to the state of corresponding to the non-penetrating region 120, the electromagnetic sensing element 112 will sense a second the intensity of the magnetic field, which is different from the second intensity of the magnetic field.

An on screen display (OSD) can be displayed on the display module 114 of the display 100 according to the invention disclosed above. Meanwhile, the control circuit board 110, which is electrically connecting with the electromagnetic sensing element 112, can determine relative position of the display module 114 with regard to the metal base 104 according to the change in the intensity of the magnetic field, i.e., the difference between the first intensity of the magnetic field and the second intensity of the magnetic field. If the display module 114 has already rotated an angle of rotation, say 90 degrees for instance, with regard to metal base 104, the control circuit board 110 also controls the OSD to rotate 90 degrees.

Similarly, if the display module 114 inversely rotates 90 degrees to the original state, the electromagnetic sensing element 112 will change to the state of corresponding to the penetrating region 118 from the state of corresponding to the non-penetrating region 120 of the metal base 104. Regardless of changing to the state of corresponding to the non-penetrating region 120 from the state of corresponding to the penetrating region 118 to, or changing to the state of corresponding to the penetrating region 118 from the state of corresponding to the state of the non-penetrating region 120, the electromagnetic sensing element 112 can enable the electromagnetic sensing element 112 to sense the change in the intensity of the magnetic field. According to change in the intensity of the magnetic field sensed by the electromagnetic sensing element 112, the control circuit board 110, which is electrically connected with the electromagnetic sensing element 112, controls the OSD to rotate 90 degrees as well.

Figure 3A:
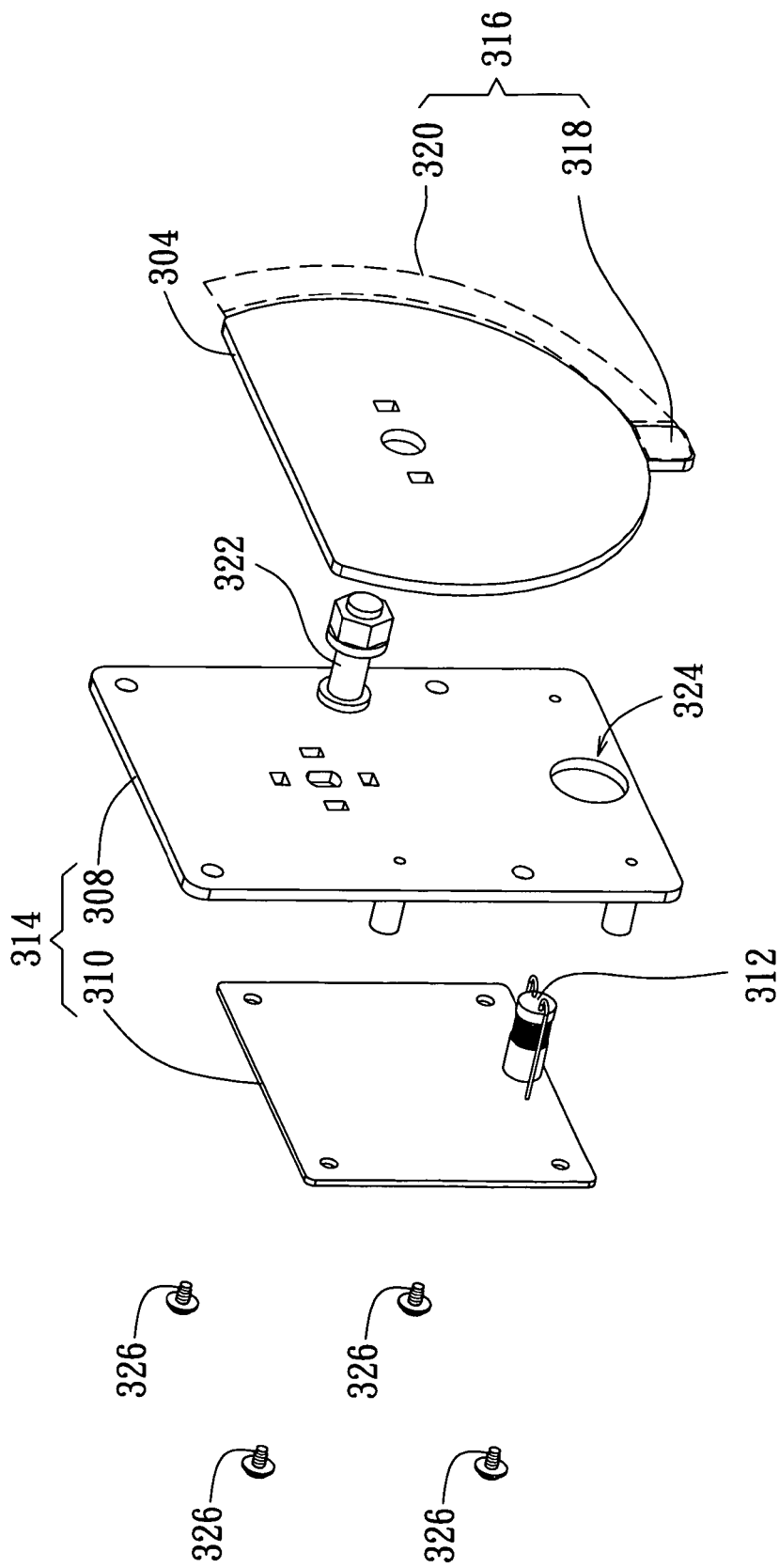
FIG. 3A is a schematic diagram of a display according to preferred embodiment two of the invention.

Referring to FIG. 3A, a schematic diagram showing that the sensing region of the metal base of preferred embodiment two includes a shielding region and a non-shielding region. To give a more detailed illustration, FIG. 3A shows a decomposition diagram of the main elements of a display. The display according to the present preferred embodiment includes a metal base 304, a disposition board 308, a control element 310 and an electromagnetic sensing element 312. The disposition board 308, the control circuit board 310 and a display panel (not shown in the diagram) are main elements of a display module 314. A screw 326 is for fastening the control circuit board 310 and the disposition board 308. A via hole 324 is disposed on the disposition board 308, wherein the electromagnetic sensing element 312 corresponds to the metal base 304 through the via hole 324. The display module 314 is rotatably coupled to the metal base 304 via the rotation axis 322.

Compared with the metal base 104 of display 100, the sensing region 316 in FIG. 3A comprises a shielding region 318 and a non-shielding region 320. Under ordinary circumstances, the electromagnetic sensing element 312 corresponds to the shielding region 318 disposed on the metal base 304. Meanwhile, the electromagnetic sensing element 312 can sense a third intensity of the magnetic field.

Figure 3B:
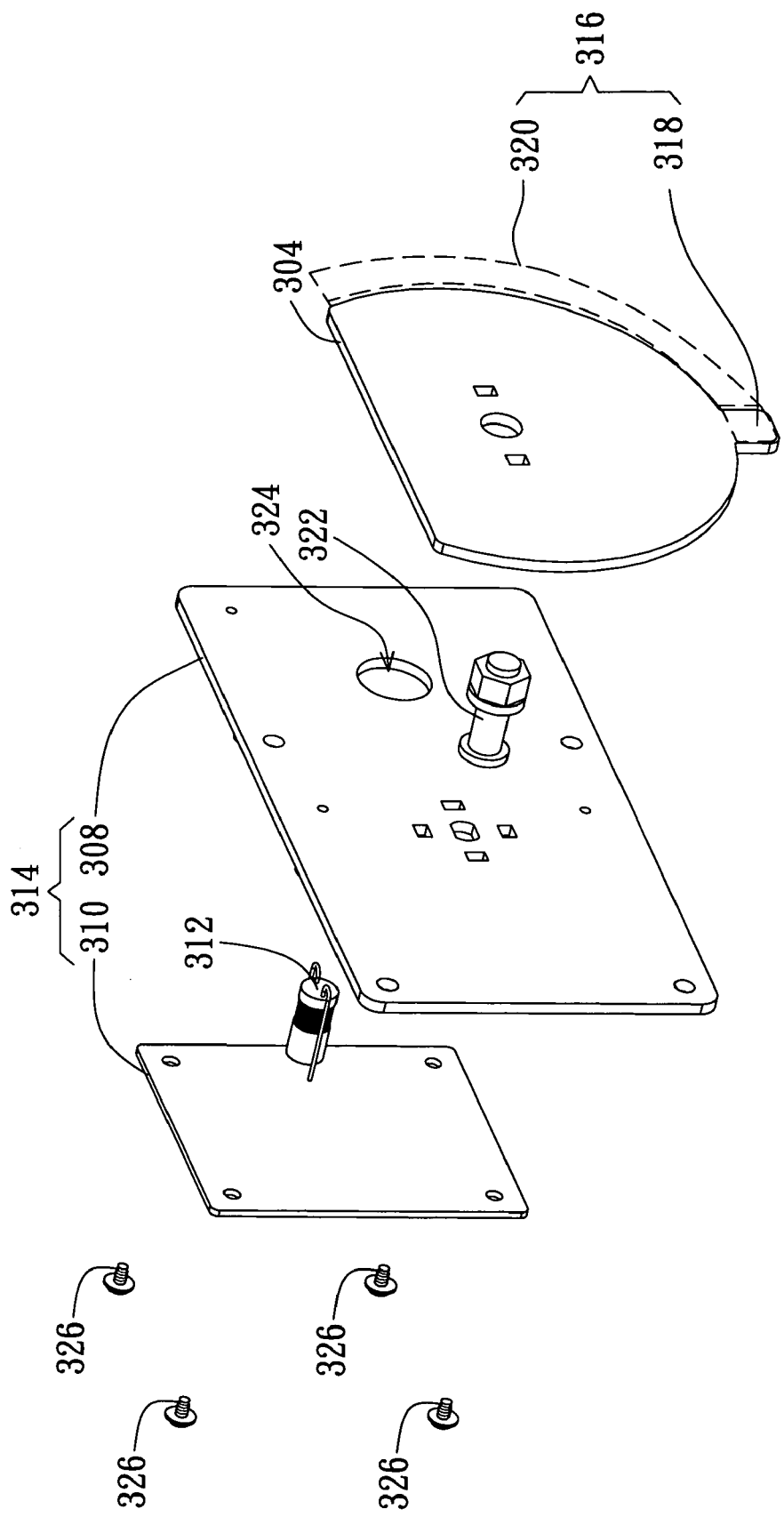
FIG. 3B is a schematic diagram showing the state after the display module 314 in FIG. 3A has rotated 90 degrees.

When display module 314 rotates around a rotation axis 322 an angle of rotation physically equal to 90 degrees with regard to metal base 304, the electromagnetic sensing element 312 will change to the state of corresponding to the non-shielding region 320 from the state of corresponding to the shielding region 318. Meanwhile, the electromagnetic sensing element 312 will sense a fourth intensity of the magnetic field, which is different from the third intensity of the magnetic field. Referring to FIG. 3B, a schematic diagram showing the state after the display module 314 in FIG. 3A has rotated 90 degrees.

Since the fourth intensity of the magnetic field and the third intensity of the magnetic field are different, the control circuit board 310 can determine relative position of the display module 314 with regard to metal base 304 according to the change in the intensity of the magnetic field, i.e., the difference between the third intensity of the magnetic field and the fourth intensity of the magnetic field. If the display module 314 has already rotated an angle of rotation, say 90 degrees for instance, with regard to metal base 304, the control circuit board 310 also controls the OSD to rotate 90 degrees as well.

Figure 4A:
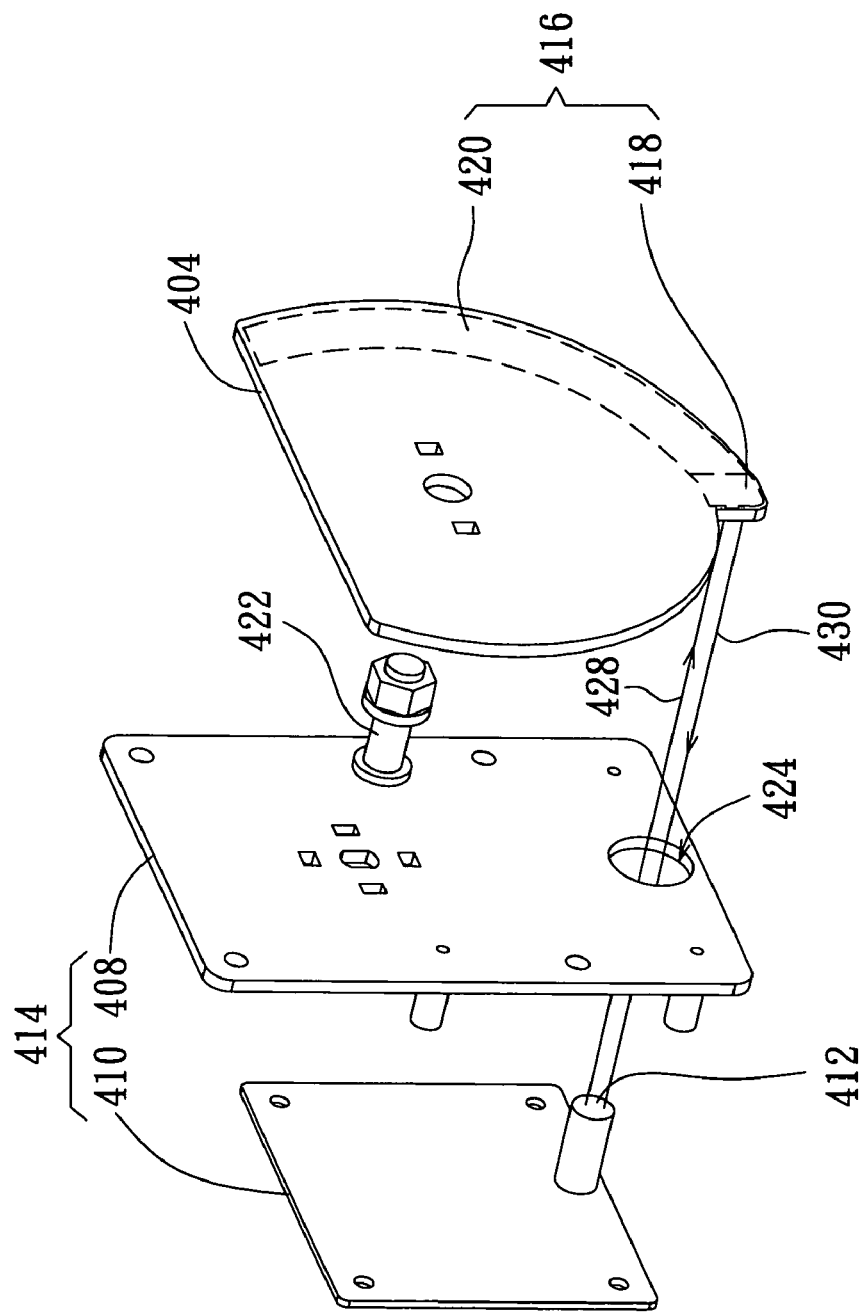
FIG. 4A is a schematic diagram of a display according to preferred embodiment three of the invention.

Referring to FIG. 4A, a schematic diagram of a display according to preferred embodiment three of the invention is shown. To give a more detailed illustration, FIG. 4A shows a decomposition diagram of the main elements of a display. The base 404 has a sensing region 416, wherein the sensing region 416 includes a reflecting region 418 and a non-reflecting region 420.

As shown in the diagram, an infra-red sensing element 412 is disposed on the control circuit board 410, wherein the infra-red sensing element 412 and control circuit board 410 are electrically connected. A screw 426 is for fastening the control circuit board 410 and the disposition board 408. A via hole 424 is disposed on the disposition board 408. The infra-red sensing element 412 disposed on the control circuit board 410 corresponds to the base 404 through the via hole 424.

The display module 414 is rotatably coupled to the base 404 via the rotation axis 422. According to a corresponding relation between the infra-red sensing element 412 and the sensing region 416, the control circuit board 410 can determine whether the display module 414 rotates with regard to the base 404.

The infra-red sensing element 412 is for emitting a first infra-red light 428 and for sensing a reflected second infra-red light 430. The reflecting region 418 of the sensing region 416 is for reflecting the first infra-red light 428 to form the second infra-red light 430.

When the corresponding relation between the sensing element and the sensing region means that the infra-red sensing element 412 corresponds to the sensing region 416, the infra-red sensing element 412 will sense the second infra-red light 430, so that the control circuit board 410 can determine whether the display module 414 rotates an angle of rotation physically equal to 90 degrees with respect to the base 404. The corresponding relation is further elaborated below.

Under ordinary circumstances as shown in FIG. 4A, the infra-red sensing element 412 corresponds to the reflecting region 418 on the base 404. Meanwhile, the reflecting region 418 on the base 404 can reflect the first infra-red light 428 to form the second infra-red light 430. Moreover, the infra-red sensing element 412 can sense the second infra-red light 430.

Figure 4B:
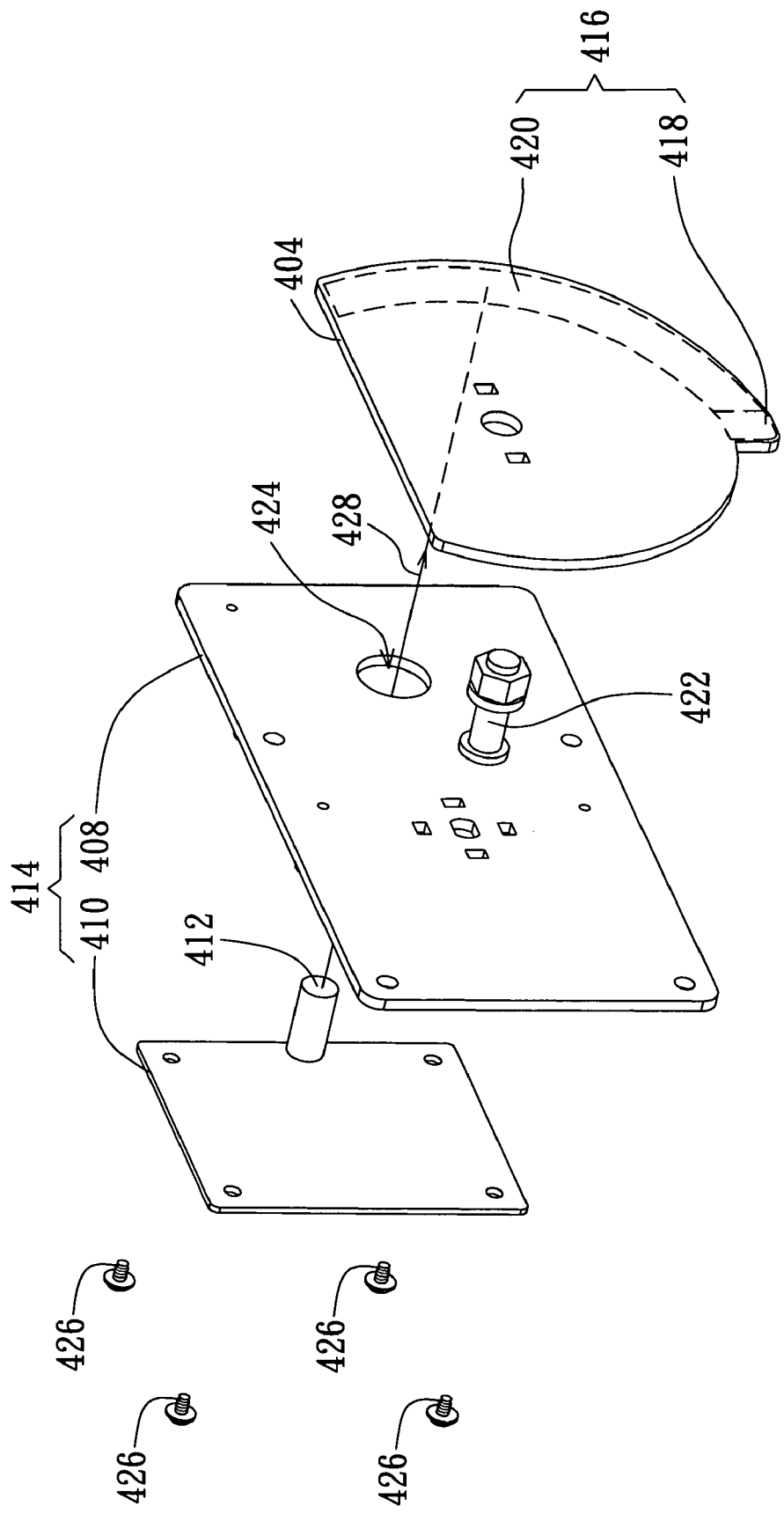
FIG. 4B is a schematic diagram showing the state after the display module 414 in FIG. 4A has rotated 90 degrees.

Refer to FIG. 4A and FIG. 4B together. FIG. 4B is a schematic diagram showing the state after the display module 414 in FIG. 4A has rotated 90 degrees. After the display module 414 has rotated 90 degrees, the infra-red sensing element 412 also rotates 90 degrees along with the control circuit board 410 to correspond to the non-reflecting region 420 of the base 404. Since the non-reflecting region 420 cannot reflect the first infra-red light 428, the infra-red sensing element 412 will not be able to sense the second infra-red light 430.

An OSD can be displayed on a display module 414 of the display according to the preferred embodiment disclosed above. Meanwhile, the control circuit board 410, which is electrically connecting with infra-red sensing element 412 can determine the relative position of the display module 414 with regard to the base 404 according to whether the second infra-red light 430 can be sensed. If the display module 414 has already rotated angle of rotation, say 90 degrees, with regard to the base 404 the control circuit board 410 also controls the OSD to rotate 90 degrees as well.

Similarly, if the display module 414 inversely rotates 90 degrees to the original state, the infra-red sensing element 412 will change to the state of corresponding to the reflecting region 418 from the state corresponding to the non-reflecting region 420 of the base 404.

Regardless of changing to the state of corresponding to the non-reflecting region 420 from the state of corresponding to the reflecting region 418, or changing to the state of corresponding to the to the reflecting region 418 from the state of corresponding to the non-reflecting region 420, the infra-red sensing element 412 can enable the infra-red sensing element 412 to sense the existence of the second infra-red light 430. According to the infra-red sensing element 412 has sensed the second infra-red light 430, the control circuit board 410 can determine whether the OSD rotates 90 degrees as well.

The reflecting region 418 in the preferred embodiment disclosed above can be a smooth surface capable of reflecting infra-red light while the non-reflecting region 420 can be a rough surface incapable of reflecting the infra-red light. The reflecting region 418 and non-reflecting region 420 of the sensing region 416 can swap their position to achieve the object of preferred embodiment three. After the position of reflecting region 418 and that of the non-reflecting region 420 are swapped, the infra-red sensing element 412 will change to the state of corresponding to the reflecting region from the state of corresponding to the non-reflecting region when the display module 414 rotates 90 degrees with regard to the base 404, so that the infra-red sensing element 412 can sense the reflected second infra-red light.

Figure 5A:
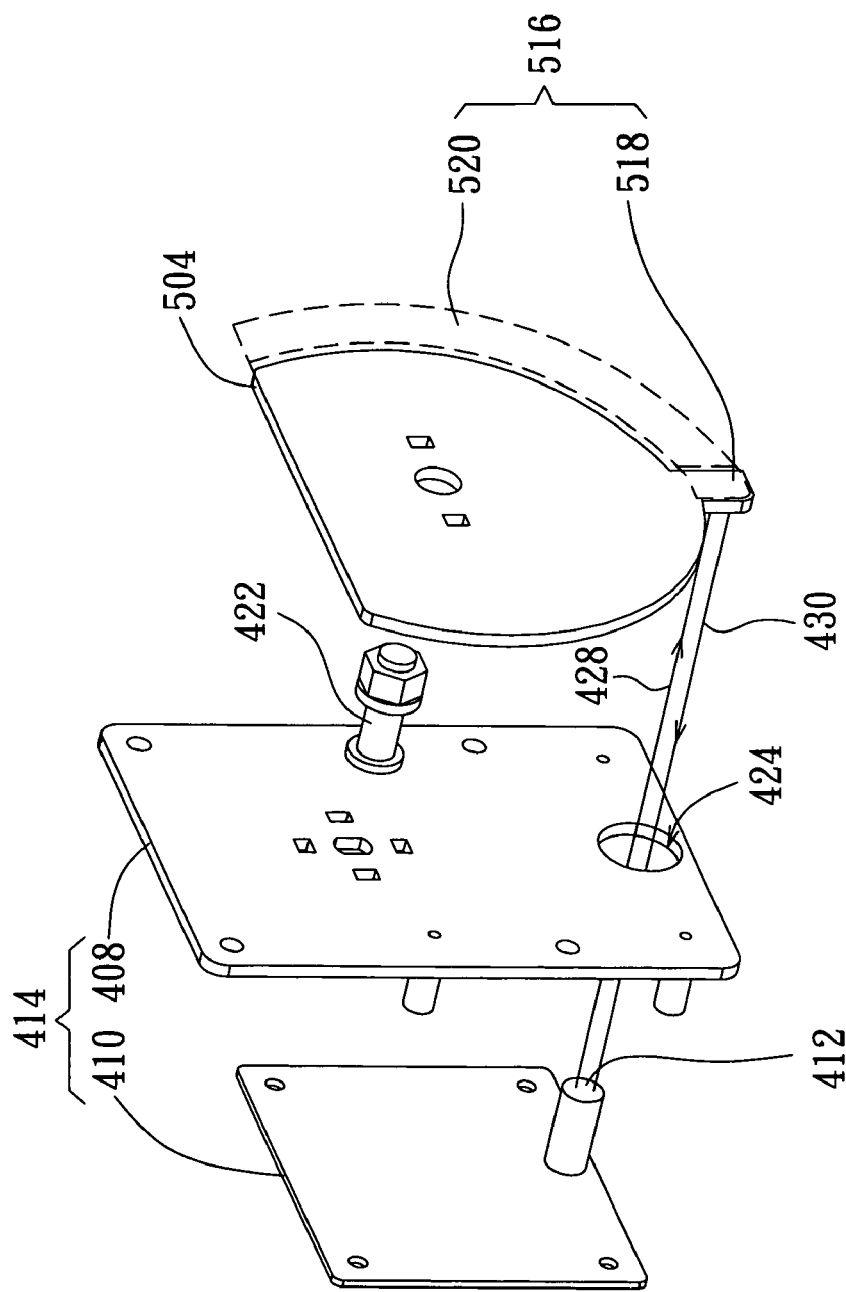
FIG. 5A is a schematic diagram of a display according to preferred embodiment four of the invention.
Figure 5B:
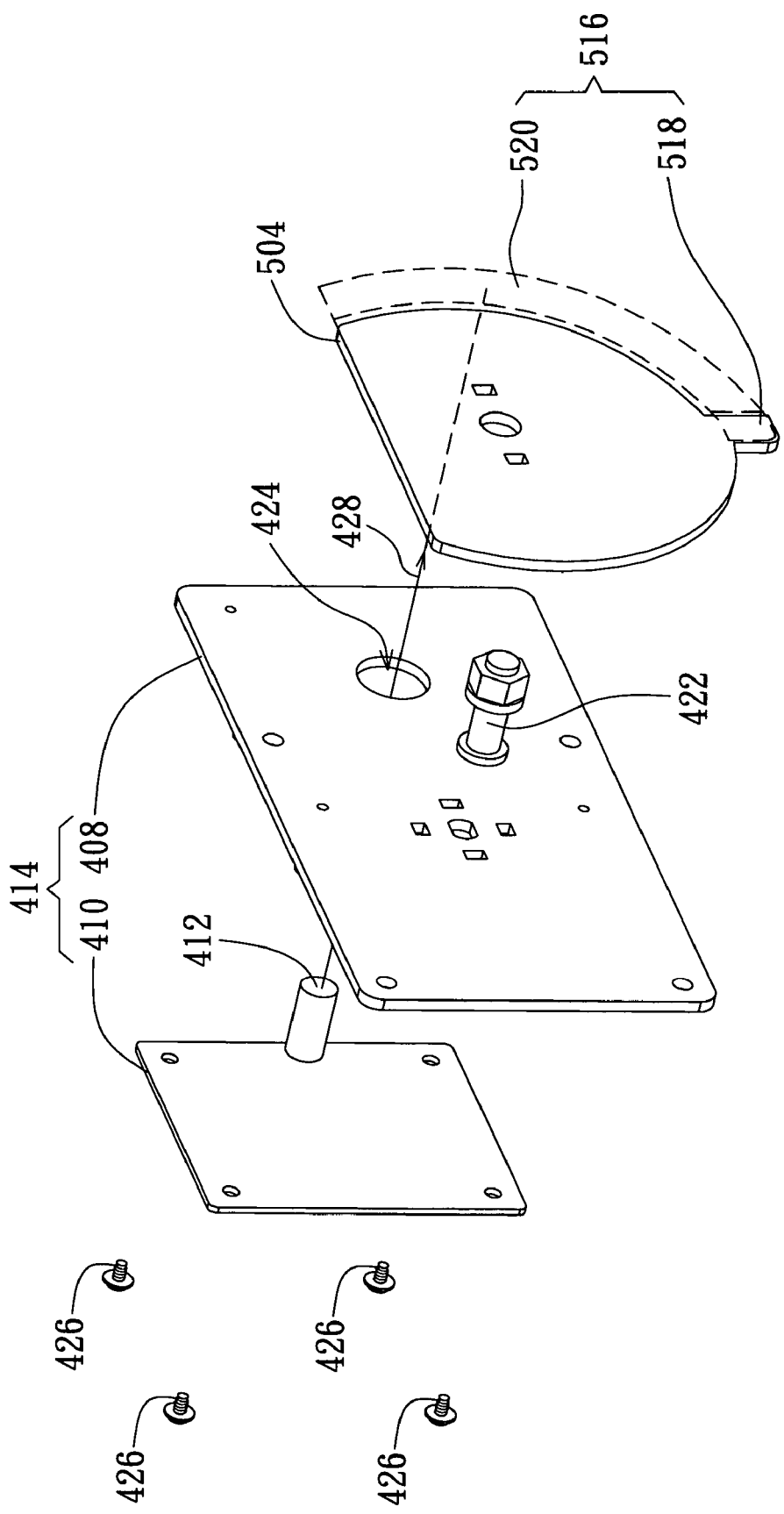
FIG. 5B is a schematic diagram showing the state after the display module 414 in FIG. 5A has rotated 90 degrees.

On the other hand, apart using a rough surface to prevent the reflection of infra-red light, the non-reflecting region 420 can use a penetrating surface to prevent the reflection of infra-red light. Refer to FIG. 5A and FIG. 5B together. FIG. 5A is a schematic diagram of a display according to preferred embodiment four of the invention, while FIG. 5B is a schematic diagram showing the state after the display module 414 in FIG. 5A has rotated 90 degrees. The present preferred embodiment uses a base 504 to replace the base 404, and remains other elements unchanged and so are the labeling in the diagram unchanged. The base 504 has a sensing region 516, wherein the sensing region 516 includes a reflecting region 518 and a non-reflecting region 520.

Compared with the non-reflecting region 420 in FIG. 4A, the non-reflecting region 520 in FIG. 5A is a penetrating surface. At the initial state, the first infra-red light 428 emitted by the infra-red sensing element 412 is reflected to become the second infra-red light 430 according to the reflecting region 518. The reflected second infra-red light 430 is received by the infra-red sensing element 421.

After the display module 414 rotated 90 degrees with regard to the base 504, the infra-red sensing element 412 will change to the state of corresponding to the non-reflecting region 520 from the state of corresponding to the reflecting region 518. Since the non-reflecting region 520 cannot reflect the first infra-red light 428, the infra-red sensing element 412 cannot sense the second infra-red light 430.

As disclosed above, the position of the reflecting region 518 of the sensing region 516 and that of the non-reflecting region 520 can be swapped to achieve the object of preferred embodiment four. After the position of reflecting region 518 and that of the non-reflecting region 520 are swapped, the infra-red sensing element 412 will change to the state of corresponding to the reflecting region from the state of corresponding to the non-reflecting region when the display module 414 rotates 90 degrees with regard to the base 504, so that infra-red sensing element 412 can sense the reflected second infra-red light.

The sensing element disclosed in the above preferred embodiment according to the invention can be an electromagnetic sensing element or an infra-red sensing element. Besides, any sensing elements used for sensing the existence or difference of generated signals are within the scope of the technology of the invention.

It can be seen in the above disclosure that the display according to the invention, has the advantages of having a simple structure, being easy to manufacture and effectively reducing manufacturing costs of the display.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A display, comprising at least:
a base having a sensing region, the sensing region comprising a shielding region, which protrudes from the base, and a non-shielding region;
a display module having a control element, wherein the display module is rotatably coupled to the base; and
a sensing element, electrically connected with the control element for sensing an intensity of radiation from the sensing region of the base, wherein the control element determines an angle of rotation of the display module with respect to the base according to intensity of radiation from the sensing region of the base sensed by the sensing element; wherein the sensing element is an electromagnetic sensing element and wherein when the electromagnetic sensing element and the shielding region correspond to each other, the electromagnetic sensing element senses a third intensity of the magnetic field, whereas when the display module rotates the angle of rotation with respect to the base, and the electromagnetic sensing element changes to the state of corresponding to the non-shielding region, the electromagnetic sensing element senses a fourth intensity of the magnetic field, which is different from the third intensity of the magnetic field.

2. The display according to claim 1, the sensing element being an electromagnetic sensing element for generating a magnetic field and for sensing an intensity of the magnetic field, and the sensing region, causing the intensity of the magnetic field to change, wherein when the sensing element and the sensing region correspond to each other, the electromagnetic sensing element senses the intensity of the magnetic field to enable the control element to determine the angle of rotation of the display module with respect to the base.

3. A display, comprising:
a base having a sensing region, wherein the sensing region comprises a penetrating region penetrating the base and a non-penetrating region;
a display module having a control element, wherein the display module is rotatably coupled to the base; and
an electromagnetic sensing element electrically connected with the control element for generating a magnetic field and sensing an intensity of the magnetic field from the sensing region;
wherein when the display module is rotated by a first angle relative to the base. the electromagnetic sensing element corresponds to the penetrating region of the base and senses a first electromagnetic-field intensity; when the display module is rotated relative to the base by a second angle, the electromagnetic sensing element moves to correspond to the non-penetrating region of the base and senses a second electromagnetic-field intensity;
wherein the control element determines a rotational angle of the display module relative to the base according to the intensity of the magnetic field sensed by the electromagnetic sensing element.

4. A display, comrprising at least:
a base having a sensing region, the sensing region comprising a shielding region, which protrudes from the base, and a non-shielding region;

a display module having a control element, wherein the display module is rotatably coupled to the base; and a sensing element electrically connected with the control element, wherein the control element determines an angle of rotation of the display module with respect to the base according to a corresponding relation between the sensing element and the sensing region, wherein when the electromagnetic sensing element and the shielding region correspond to each other, the electromagnetic sensing element senses a third intensity of the magnetic field, whereas when the display module rotates the angle of rotation with respect to the base, and the electromagnetic sensing element changes to the state of corresponding to the non-shielding region, the electromagnetic sensing element senses a fourth intensity of the magnetic field, which is different from the third intensity of the magnetic field.

5. The display according to claim 2, the display module displaying an on screen display (OSD), wherein when the control element determines the angle of rotation of the display module with respect to the base according to the intensity of the magnetic field, the control element controls the OSD to rotate the angle of rotation.

6. The display according to claim 2, wherein the base is a metal base.

7. A display, comprising at least:
a base having a sensing region;
a display module having a control element, wherein the display module is rotatably coupled to the base; and
a sensing element electrically connected with the control element, wherein the control element determines an angle of rotation of the display module with respect to the base according to a corresponding relation between the sensing element and the sensing region, wherein the sensing element is an infra-red sensing element capable of emitting a first infra-red light and sensing a reflected second infra-red light, and when the infra-red sensing element and the sensing region correspond to each other, the infra-red sensing element senses the second infra-red light, so that the control element determines the angle of rotation of the display module with respect to the base.

8. The display according to claim 7, wherein the sensing region comprises a reflecting region and a non-reflecting region, and when the display module rotates the angle of rotation with respect to the base, the infra-red sensing element will change to the state of corresponding to the non-reflecting region from the state of corresponding to the reflecting region, so that the infra-red sensing element cannot sense the second infra-red light.

9. The display according to claim 7, wherein the sensing region comprises a non-reflecting region and a reflecting region, and when the display module rotates the angle of rotation with respect to the base, the infra-red sensing element will change to the state of corresponding to the reflecting region from the state of corresponding to the non-reflecting region, so that the infra-red sensing element can sense the second infra-red light.

10. The display according to claim 1, wherein the angle of rotation is substantially 90 degrees.

11. The display according to claim 1, wherein the control element is a control circuit board.

12. A display, at least comprising:
a metal base having a sensing region, the sensing region comprising a shielding region, which protrudes from the base, and a non-shielding region;
a display module having a control element, wherein the display module is rotatable coupled to the metal base with an angle of rotation; and
an electromagnetic sensing element for generating a magnetic field and for sensing an intensity of the magnetic field radiated from the sensing region of the metal base, wherein the electromagnetic sensing element and the control element are electrically connected, and when the electromagnetic sensing element and the sensing region correspond to each other, the sensing region will cause the intensity of the magnetic field to change;
wherein the control element can detect the angle of rotation of the display module with respect to the metal base according to the intensity of the magnetic field sensed by the electromagnetic sensing element; and
wherein when the electromagnetic sensing element and the shielding region correspond to each other, the electromagnetic sensing element senses a third intensity of the magnetic field, whereas when the display module rotates the angle of rotation with respect to the base, and the electromagnetic sensing element changes to the state of corresponding to the non-shielding region, the electromagnetic sensing element senses a fourth intensity of the magnetic field, which is different from the third intensity of the magnetic field.

13. The display according to claim 12, the display module displaying an OSD, wherein when the control element, according to the intensity of the magnetic field, determines the angle of rotation of the display module with respect to the metal base, the control element controls the OSD to rotate the angle of rotation.

14. The display according to claim 12, wherein the sensing region comprises a penetrating region, which penetrates the metal base, and a non-penetrating region, and when the display module rotates the angle of rotation with respect to the metal base, the electromagnetic sensing element changes to the state of corresponding to the non-penetrating region from the state of corresponding to the penetrating region, so that the intensity of the magnetic field changes.

15. The display according to claim 12, the sensing region comprising a shielding region, which protrudes from the base, and a non-shielding region, wherein when the display module rotates the angle of rotation with respect to the metal base, the electromagnetic sensing element changes to the state of corresponding to the non-shielding region from the state of corresponding to the shielding region, so that the intensity of the magnetic field will change.

16. The display according to claim 12, wherein the angle of rotation is substantially 90 degrees.

17. The display according to claim 12, wherein the control element is a control circuit board.

* * * * *